United States Patent
Xiong et al.

(10) Patent No.: US 10,798,651 B2
(45) Date of Patent: Oct. 6, 2020

(54) METHOD AND SYSTEM FOR ENERGY EFFICIENT WIRELESS COMMUNICATIONS

(71) Applicant: Intelligent Fusion Technology, Inc, Germantown, MD (US)

(72) Inventors: Wenhao Xiong, Germantown, MD (US); Yi Li, Germantown, MD (US); Xin Tian, Germantown, MD (US); Dan Shen, Germantown, MD (US); Nichole Sullivan, Germantown, MD (US); Biao Chen, Jamesville, NY (US); Genshe Chen, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 91 days.

(21) Appl. No.: 16/104,760

(22) Filed: Aug. 17, 2018

(65) Prior Publication Data
US 2020/0059859 A1    Feb. 20, 2020

(51) Int. Cl.
| | | |
|---|---|---|
| *H04W 52/02* | (2009.01) | |
| *H04W 28/18* | (2009.01) | |
| *H04W 80/04* | (2009.01) | |
| *H04W 80/02* | (2009.01) | |

(52) U.S. Cl.
CPC ....... *H04W 52/0203* (2013.01); *H04W 28/18* (2013.01); *H04W 80/02* (2013.01); *H04W 80/04* (2013.01)

(58) Field of Classification Search
None
See application file for complete search history.

(56) References Cited

U.S. PATENT DOCUMENTS

| | | | | |
|---|---|---|---|---|
| 6,226,279 B1* | 5/2001 | Hansson | ............... | H04L 12/413 370/328 |
| 9,467,925 B1* | 10/2016 | Baroudi | ............... | H04W 40/10 |
| 2009/0067355 A1* | 3/2009 | Haartsen | ............... | H04W 72/08 370/311 |
| 2009/0213849 A1* | 8/2009 | Sachs | ............... | H04L 45/123 370/389 |
| 2010/0172296 A1* | 7/2010 | Singh | ............... | H04W 84/18 370/328 |
| 2011/0019693 A1* | 1/2011 | Fu | ............... | H04L 69/32 370/469 |
| 2016/0119931 A1* | 4/2016 | Soriaga | ............... | H04W 52/028 370/329 |
| 2020/0053591 A1* | 2/2020 | Prasad | ............... | G06N 20/00 |

* cited by examiner

*Primary Examiner* — Jenkey Van
(74) *Attorney, Agent, or Firm* — Anova Law Group, PLLC

(57) ABSTRACT

A three-layer protocol stack in a wireless communication device and a wireless communication network are provided. The three-layer protocol stack includes a physical layer; a medium access control (MAC) layer; and a network layer. The physical layer includes one or more circuits to conduct a power consumption minimization and a waveform selection. The MAC layer is configured to perform a medium access control and a resource block reconfiguration. The network layer is configured to perform an energy efficient routing and connection maintenance. The physical layer, the MAC layer and the network layer cooperate with each other to at least reduce an energy consumption of the wireless communication device.

10 Claims, 9 Drawing Sheets

METHOD AND SYSTEM FOR ENERGY EFFICIENT WIRELESS COMMUNICATIONS

GOVERNMENT RIGHTS

This invention was made with Government support under Contract No. FA8750-17-C-0253, awarded by the United States Air Force. The U.S. Government has certain rights in this invention.

FIELD OF THE DISCLOSURE

The present disclosure generally relates to the field of wireless communication technology and, more particularly, relates to a method and a system for energy efficient wireless communications.

BACKGROUND

Energy and spectrum efficiencies are critical factors in wireless communications, especially for the wireless communication between handheld and wearable communication devices that are battery powered. A drained battery can cause sudden shutdown of such devices, thus impacting the connectivity of the entire communication network. Thus, a wireless communication network that achieves efficient energy utilization of single nodes and efficient cooperation between different nodes needs to be realized.

The disclosed method and system for energy efficient wireless communications are directed to solving one or more problems set forth above and other problems in the art.

BRIEF SUMMARY OF THE DISCLOSURE

One aspect of the present disclosure provides a three-layer protocol stack in a wireless communication device. The three-layer protocol stack includes a physical layer; a medium access control (MAC) layer; and a network layer. The physical layer includes one or more circuits to conduct a power consumption minimization and a waveform selection. The MAC layer is configured to perform a medium access control and a resource block reconfiguration. The network layer is configured to perform an energy efficient routing and connection maintenance. The physical layer, the MAC layer and the network layer cooperate with each other to at least reduce an energy consumption of the wireless communication device.

Another aspect of the present disclosure provides a wireless communication network. The wireless communication network includes a plurality of nodes, each node including a three-layer protocol stack. The three-layer protocol stack includes a physical layer; a medium access control (MAC) layer; and a network layer. The physical layer includes one or more circuits to conduct a power consumption minimization and a waveform selection. The MAC layer is configured to perform a medium access control and a resource block reconfiguration. The network layer is configured to perform an energy efficient routing and connection maintenance. The physical layer, the MAC layer and the network layer cooperate with each other to at least reduce an energy consumption of the wireless communication device.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
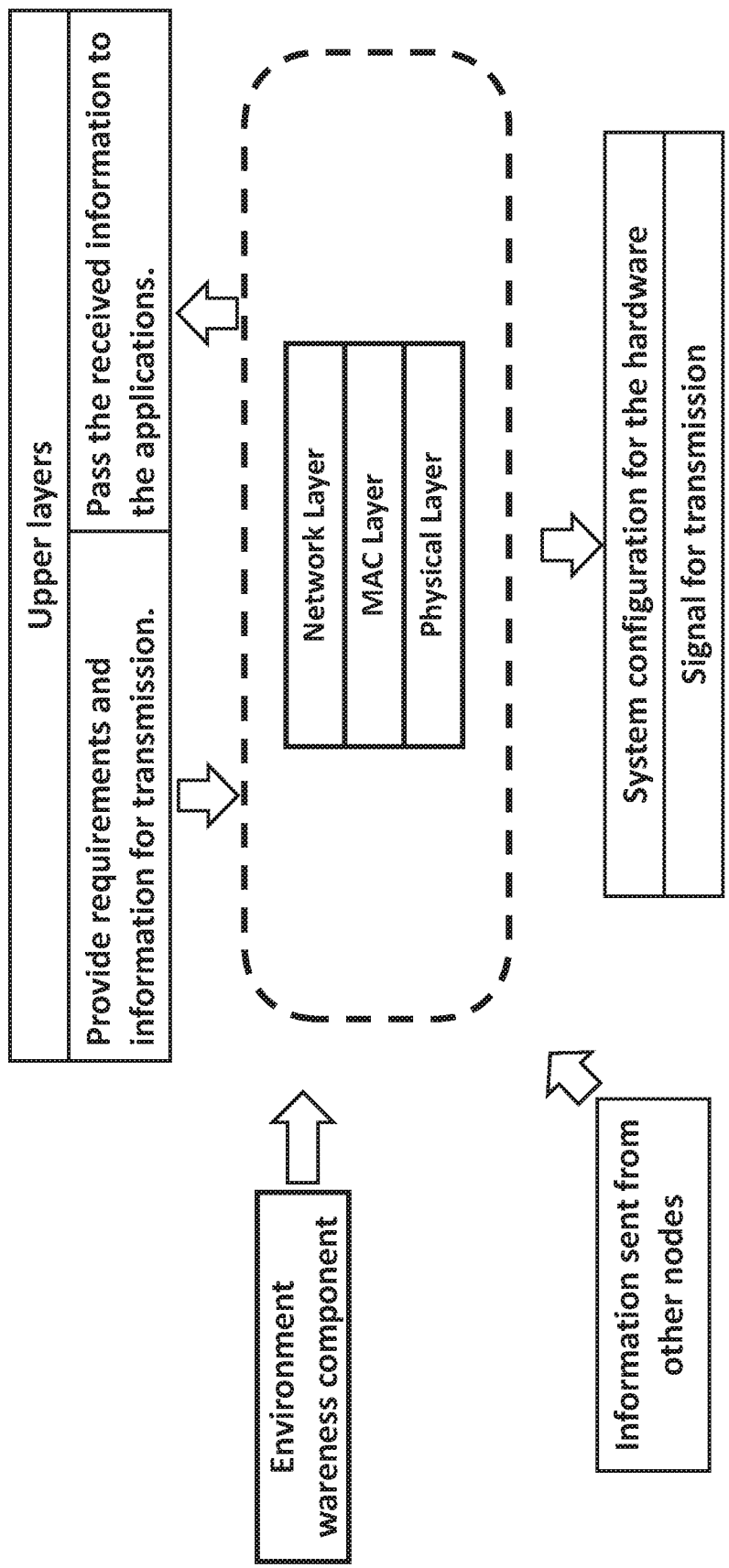
FIG. 1 illustrates an exemplary system for energy efficiency wireless communication according to some embodiments of the present disclosure.

Reference will now be made in detail to exemplary embodiments of the disclosure, which are illustrated in the accompanying drawings. Hereinafter, embodiments consistent with the disclosure will be described with reference to drawings. It is apparent that the described embodiments are some but not all of the embodiments of the present invention. Based on the disclosed embodiments, persons of ordinary skill in the art may derive other embodiments consistent with the present disclosure, all of which are within the scope of the present invention.

When no conflict exists, the exemplary features illustrated in various embodiments may be combined and/or rearranged. The specific details provided in the descriptions of various embodiments are intended to help understanding the present disclosure. However, the present disclosure may be implemented in other manners that are not described herein. Thus, the scope of the present disclosure is not limited to the disclosed embodiments. In various embodiments, the terms "first" and "second", etc., are used to describe technical differentiations, and such terms may be replaced without departing from the scope of the present disclosure.

As used herein, a wireless communication network enables data between communication devices by providing data services such as Internet access, voice calling, text messaging, and media streaming. A communication device herein may be any portable or fixed device such as a mobile phone, a tablet, or a camera.

Further, a communication device may be referred to as a "node", and the wireless communication network may include a plurality of nodes. Each node may include a transceiver (transmitter and receiver) for transmitting and receiving signals, a processor, a memory, and/or an energy source. The transceiver may be, for example, a radio unit. The processor may be, for example, a micro-controller. The memory may be, for example, a read-only memory (ROM) for storing information of operations of the node, or a random-access memory (RAM) for storing information of wireless links or communication routes. The energy source may be, for example, a battery.

Further, a node may rely on the transceiver to establish a wireless link with another node, and when a node cannot establish a wireless link with a specified node, multiple wireless links may be used to form a communication route between the two nodes to establish a connection. The quality of a communication route may depend on the quality of the wireless links forming the communication route. For example, if one or more wireless links of the communication route fail or an obstruction occurs to cut off a wireless link, the communication through the communication route may be interrupted. Further, a node may be moved around, and the number and magnitude of the obstructions may vary between the node with respect to another node. Therefore, a method and a system for energy efficient wireless communications are highly desired, to achieve an energy efficient communication network.

The present disclosure provides an energy efficient method and system for the wireless communication and networking. The disclosed system may include a three-layer protocol stack used in a communication device for wireless communications. The disclosed system arrangement can greatly reduce the energy consumption for communication, extend the lifetime of the entire network, and provide Quality of service (QoS) guarantees at the same time.

For example, in addition to the three-layer protocol stack, the disclosed method and system may further include an environment awareness component to provide necessary input, while the three-layer protocol stack, as a communication protocol stack, may minimize the energy consumption at a physical layer, coordinate links at a medium access control (MAC) layer, and maximize the lifetime at a network layer of the three-layer protocol stack. Accordingly, the transmission delay may be decreased, the operational lifetime may be elongated, and the communication throughput may be improved, to achieve an energy efficient communication network.

FIG. 1 illustrates an exemplary system for energy efficiency wireless communication according to some embodiments of the present disclosure. The exemplary system may be contained in and implemented by one or more nodes in wireless communications.

The exemplary system in FIG. 1 may include a three-layer protocol stack. As shown, an exemplary three-layer stack may include a network layer, a MAC layer, and a physical layer, stacked one another. Additional layers, such as multiple upper layers over the three-layer protocol stack may further be included in the disclosed system. The three-layer protocol stack may be arranged for each of one or more nodes in the network.

For example, each node (e.g., a communication device) may contain the disclosed three-layer protocol stack component. As disclosed herein, a control plane and a user data plane may be involved and referred to, with respect to the entire communication system. The control plane describes how the system-controlled messages are transmitted. The user data plane describes how the user data is transmitted. Each layer in the disclosed system may have functions for the control plane which generates or transmits the control messages. Each layer in the disclosed system may also have functions for the user data plane which transmits the user data, and In the control plane, the three-layer protocol stack takes information about the environment from an environment awareness component, such as a battlefield learning component, receives control information from other nodes, and obtains the performance requirements from the upper layers, and then determines configuration of the physical layer. The configuration of physical layer may include parameters of the hardware, such as a transmitter. Such parameters may include the transmission power, modulation and demodulation parameters, etc.

In the user data plane, the three-layer protocol stack processes the data from upper layers to generate the signals for transmission and process the received information from other nodes to pass the messages for the upper layers.

The battlefield environment learning component learns the variation of the environments, and then delivers the information to the three-layer protocol stack, including the distributions of channel fading and interference strength. Such information may be used by the physical layer with the power optimization function in the three-layer protocol stack. Using the information concerning channel fading, interference and QoS requirements, the physical layer control algorithm computes the optimal transmission power and selects the best waveform with the goal to minimize the energy consumption for the power optimization.

By exchanging control information with other nodes in the network, the MAC layer control algorithm performs resource allocation to avoid conflicts among the users. In some embodiments, through the co-operations among the nodes in the network, the network layer function finds the optimal route to deliver the packets to extend the lifetime of the entire system.

In some embodiments, the physical layer may be the lowest layer, the MAC layer may be stacked above the physical layer, and the network layer may be stacked above the MAC layer.

The physical layer may include a plurality of circuits, configured to transmit and receive data with the MAC layer and/or the network layer. The MAC layer may be configured to process the data. The network layer may be embedded with one or more routing algorithms for control routing of data packets (e.g., multimedia content) transmitted between different nodes in a wireless communication network. Detailed descriptions of the physical layer, the MAC layer, and the network layer may be provided later in this specification.

Optionally, the disclosed system may further include upper layers, such as a transport layer and an application layer. Examples of the transport layer include TCP and UDP protocols. The application layer may, for example, provide application protocols, such as real-time transport protocol (RTP) for an application program (hereinafter referred to as "application") to ensure effective communication with another application. The three-layer protocol stack may pass the received information to applications through the upper layers, and the upper layers may provide criteria and information for transmission to the three-layer protocol stack.

Optionally, the disclosed system may further include a battlefield environment learning component, and the battlefield environment learning component keeps tracking the channel fading and interference strength via channel estimation and channel sensing techniques, respectively. Using the samples continuously received, the probability density functions of the channel gain and interference power can be estimated using a kernel density estimation method. These probability distribution functions regarding the wireless channel are provided to the physical layer. The channel sensing results are also given to the MAC layer to find available resource blocks.

Figure 2:
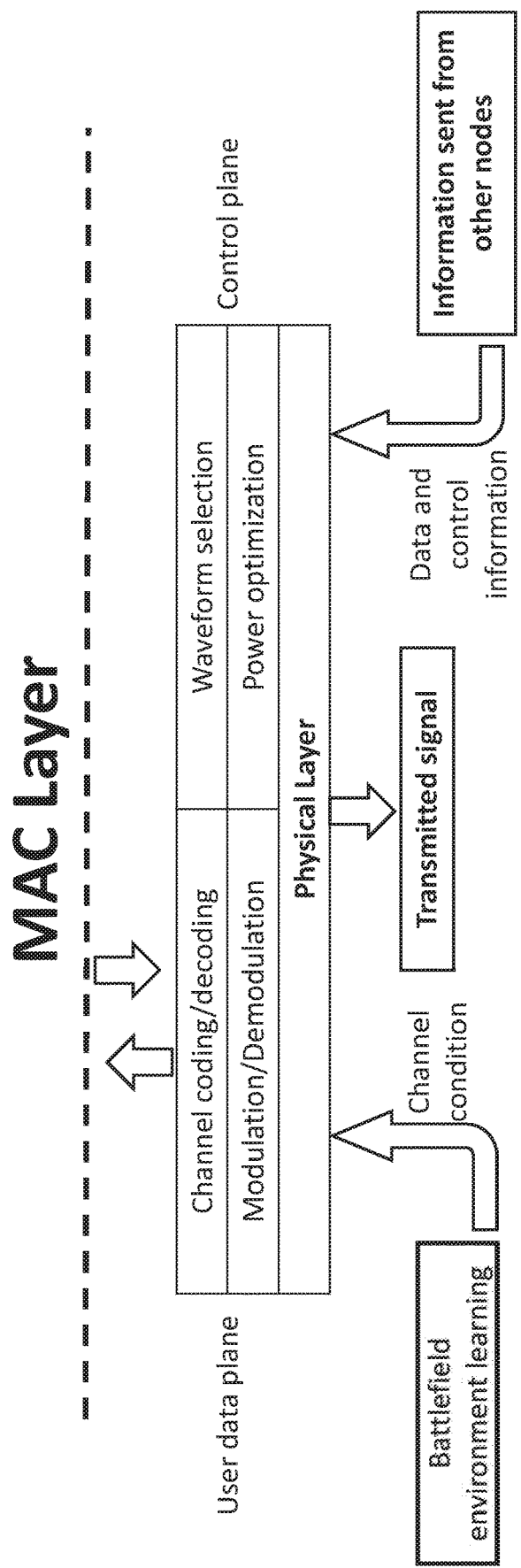
FIG. 2 illustrates an exemplary physical layer for power optimization and waveform selection, according to some embodiments of the present disclosure.

FIG. 2 illustrates an exemplary physical layer for power optimization and waveform selection according to some embodiments of the present disclosure. As shown in FIG. 2, the physical layer may perform channel coding/decoding and modulation/demodulation in the user data plane. Further, the physical layer may conduct power optimization and waveform selection in the control plane.

A channel may be a frequency band. In some cases, a channel may refer to a wireless channel for wireless connection between nodes. Channel coding may include a coding process protecting the message from being corrupted by the noise and distortion of the wireless channel.

A link is a direct connection between two nodes/users without any relay. In some cases, a link may include two end points/users and the direct connection between these two users. A route is a group of connected links that connect the source to the destination. The quality of a route is considered as a function of the qualities of the links on the route.

In some embodiments, channel coding/decoding may be performed using low density parity check (LDPC) coding. In the LDPC coding, the length of each coded block may be fixed as 300 bits, and the coding rate may be varied to adjust the spectral efficiency. Further, modulation/demodulation may be performed using quadrature phase shift keying (QPSK) or eight phase shift keying (8PSK).

Accordingly, there may be 8 different combinations of coding and modulation algorithm: LDPC with coding rate 1/4 plus QPSK, LDPC with coding rate 1/3 plus QPSK, LDPC with coding rate 1/2 plus QPSK, LDPC with coding rate 2/3 plus QPSK, LDPC with coding rate 4/5 plus QPSK, LDPC with coding rate 9/10 plus QPSK, LDPC with coding rate 2/3 plus 8PSK, and LDPC with coding rate 5/6 plus 8PSK. Based on each combination, a corresponding waveform may be arranged, and the error performance of each waveform may be evaluated offline via software simulation. The simulation result is stored for power optimization and waveform selection.

For example, for each waveform among a plurality of waveforms, average power consumption of each waveform may be computed. Further, the transmission power that minimizes the average energy consumption may be computed based on QoS constraints. For example, the QoS constraints include: (1) the transmission power needs be smaller than a maximum power that can be supported by the hardware; and (2) the probability that a packet is successfully transmitted before the deadline needs to be greater than a target probability.

Based on the transmission power that minimizes the average energy consumption for each waveform, the waveform with minimum average energy consumption is selected from the plurality of waveforms as a desired waveform for transmission.

Figure 3:
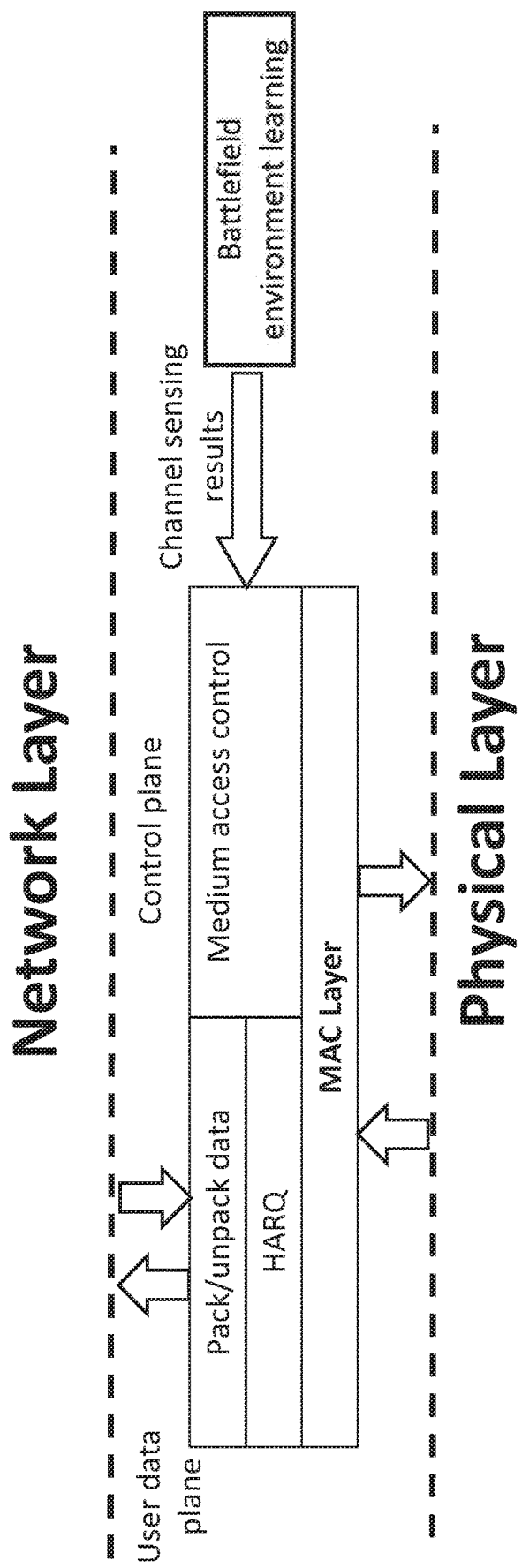
FIG. 3 illustrates an exemplary MAC layer for medium access control to realize link coordination, according to some embodiments of the present disclosure.

FIG. 3 illustrates an exemplary MAC layer for medium access control to realize link coordination according to some embodiments of the present disclosure.

The MAC layer performs hybrid automatic repeat request (HARQ) and data packing/unpacking in the user data plane, and medium access control in the control plane. HARQ is used to improve both energy efficiency and spectral efficiency. In HARQ schemes, a packet is transmitted multiple times and combined at the receiver side, until it is successfully transmitted or reaches the deadline for transmission. The receiver is another node receiving the transmitted signal.

Further, the data packing process converts the data coming from upper layers into formats accepted by the physical layer. Similarly, the data unpacking process converts the data from the physical layer into the formats for receiving at the network layer.

A resource block corresponds to a frequency band together with a time period. If a resource block is available, it means that no user occupies that frequency band during that time period.

In the control plane of the MAC layer, different links may compete with each other to obtain resource blocks for transmission. For example, in a multi-frequency time division multiple access (MF-TDMA) case, resource blocks are defined in the time-frequency domain, and each resource block occupies a certain frequency band over a time period.

Figure 4:
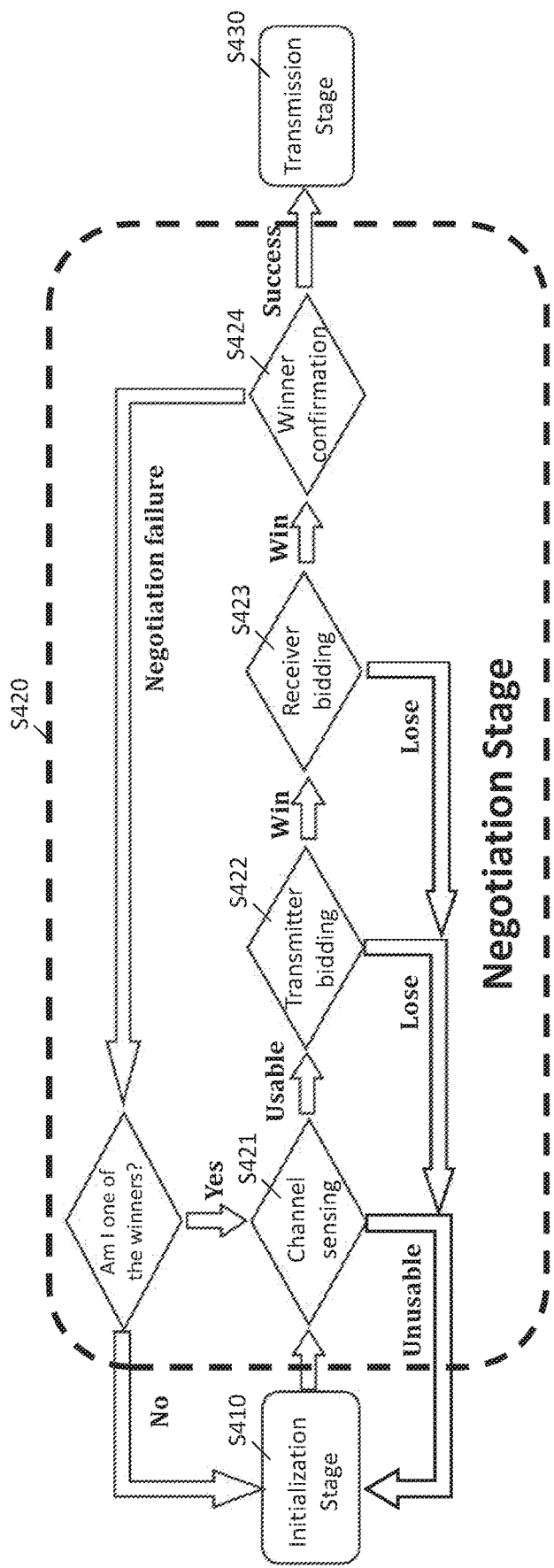
FIG. 4 illustrates a block diagram for an exemplary medium access control process implemented through a MAC layer according to some embodiments of the present disclosure.

FIG. 4 illustrates a block diagram for an exemplary medium access control process, according to some embodiments of the present disclosure.

As shown in FIG. 4, the medium access control process may include an initialization stage (S410), a negotiation stage (S420), and a transmission stage (S430). At the initialization stage, each link formed by a receiver and a corresponding transmitter selects an unoccupied and available resource block. Further, the negotiation stage (S420) may further include a channel sensing sub-stage (S421), a transmitter bidding sub-stage (S422), a receiver bidding sub-stage (S423), and a winner confirmation sub-stage (S424).

As used herein, a stage means a certain phase and each stage includes one or more processes. For example, the initialization stage may include an initialization process, in which users perform channel sensing to determine which resource block is usable.

At channel sensing sub-stage (S421), each link performs channel sensing to confirm the selected resource block is still usable, otherwise it goes back to the initialization stage S410. At transmitter bidding sub-stage (S422), if the selected resource block is still usable, bidding processes that include transmitter bidding sub-stage (S422) and receiver bidding sub-stage (S423) may be further performed, in which a link with a highest utility value is selected as a winner.

The utility is defined and determined by the system requirements, and at the transmitter bidding sub-stage (S422), different transmitters may broadcast their utility numbers. The term "utility" may refer to the utility function, e.g., as in a game theory. A utility function for a given player assigns a number for every possible outcome of the game with the property that a higher number implies that the outcome is more preferred. A utility value is the number assigned by the utility function to a user/node.

For each transmitter, the corresponding receiver may compare the utility value received from the transmitter with utility values received from other transmitters. If its corresponding transmitter provides the maximum utility value, the process proceeds to the receiver bidding stage sub-stage (S423), where the receiver broadcasts its utility in the receiver bidding step. Otherwise, the link goes back to the initialization stage (S410).

Further, at the receiver bidding sub-stage (S423), the receiver broadcasts its utility, and the transmitter compares the utility from its receiver with the utilities received from other receivers. If the corresponding receiver provides the highest utility, then the link becomes the winner of the competition. Otherwise, the link goes back to the initialization stage (S410).

At winner confirmation sub-stage (S424), the winner of the competition (the link with a highest utility) confirms with other links, and then starts transmission using the resource block if the confirmation succeeds, otherwise it is indicated that the negotiation fails and additional competition rounds are performed. For example, the winner may send a confirmation message in the confirmation stage. If it detects confirmation messages from other users, a conflict is detected, otherwise the winning is confirmed. When a conflict is detected, the winners will repeat the competition to determine who is a real winner, and other users will give up this resource block and compete for other usable resource blocks.

Another function of the medium access control is resource block reconfiguration, which in the control plane. The resource block reconfiguration and the medium access control are not hand in hand. Resource block reconfiguration is a part of medium access control. Due to the mobility of the nodes and the variation of the transmission power, a link may experience interference from other links during the transmission, and reconfiguration may be necessary for such cases.

Figure 5:
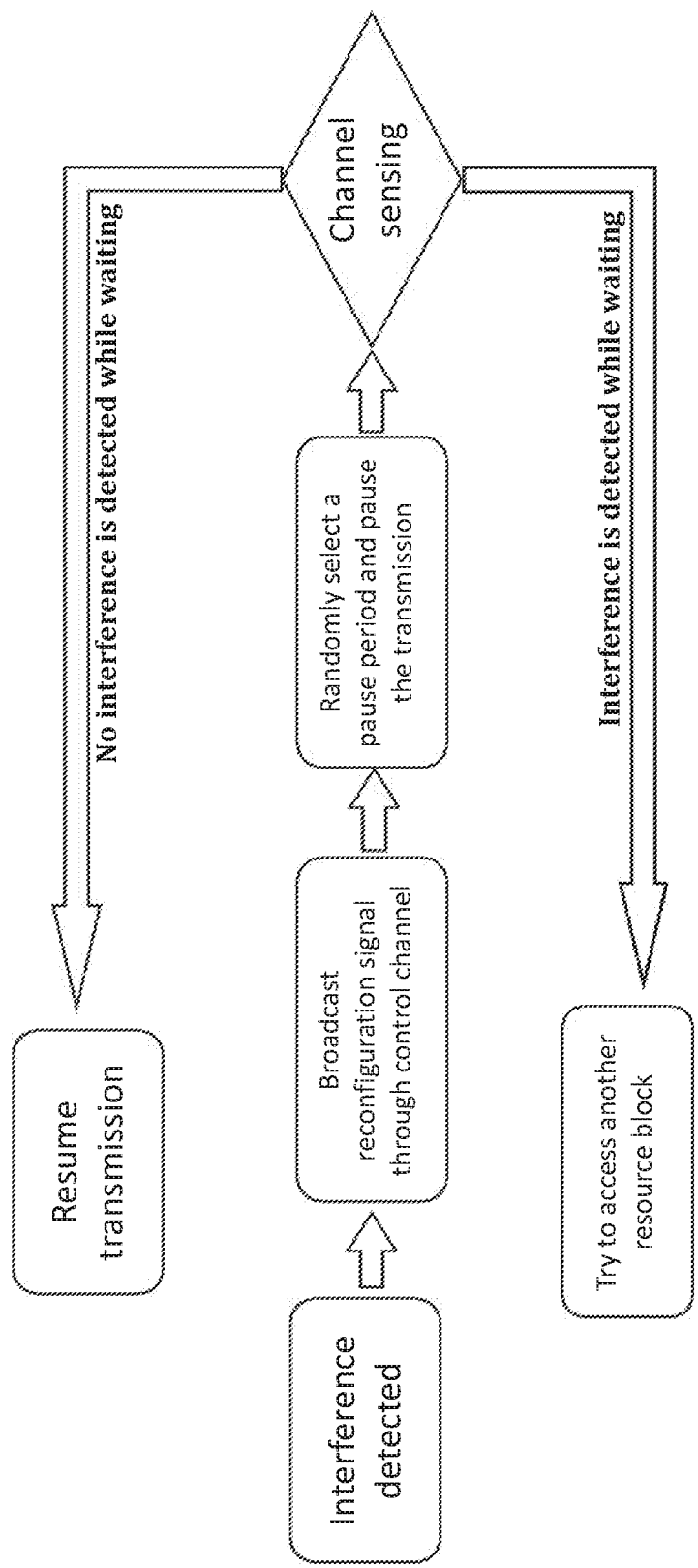
FIG. 5 illustrates an exemplary resource block reconfiguration process implemented through a MAC layer according to some embodiments of the present disclosure.

FIG. 5 illustrates an exemplary resource block reconfiguration process to effectively avoid interference between different links according to some embodiments of the present disclosure.

As shown in FIG. 5, if there is a potential connection loss due to interference, a receiver who detects the interference broadcasts a reconfiguration signal via a control channel to pause the transmission. All links occupying the same resource block also stop their transmission if they receive the reconfiguration signal. Further, each link schedules a random period to resume its transmission. For example, all links pause the transmission after detecting the conflict, and each one resumes transmission after a random time period. If interference (signals from other links) is detected before resuming transmission, then the link gives up this resource block. In such a way, these nodes do not resume transmission simultaneously. The node resumes earlier has higher chance to occupy the resource block. If interference is detected while waiting to resume, then the link drops the resource block and tries to access an alternative resource block via the same process shown in FIG. 4. If no interference is detected while waiting to resume, the link resumes transmission. Using this reconfiguration method, the first link that resumes retransmission continues to use the resource block.

Figure 6:
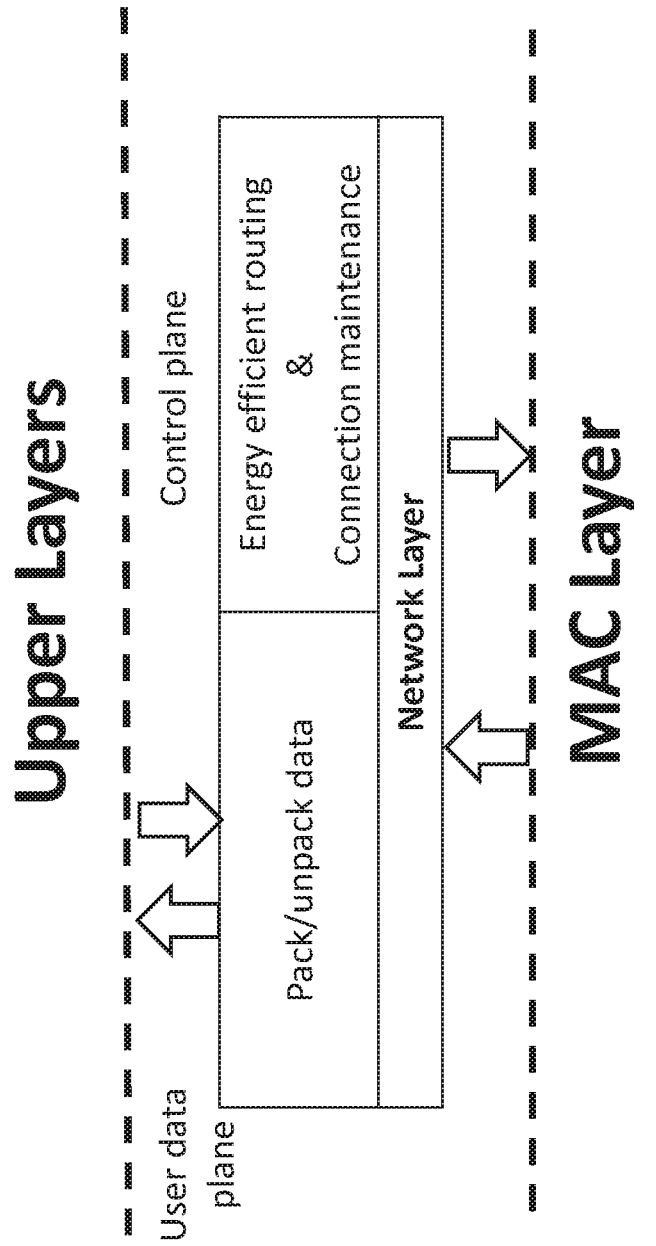
FIG. 6 illustrates an exemplary network layer according to some embodiments of the present disclosure.

FIG. 6 illustrates an exemplary network layer according to some embodiments of the present disclosure. As shown in FIG. 6, the network layer performs data packing/unpacking in the user data plane, and conducts energy efficient routing and connection maintenance in the control plane. Similar to the MAC layer, the data packing/unpacking performs format conversion for the data coming from upper layers and MAC layer.

Figure 7:
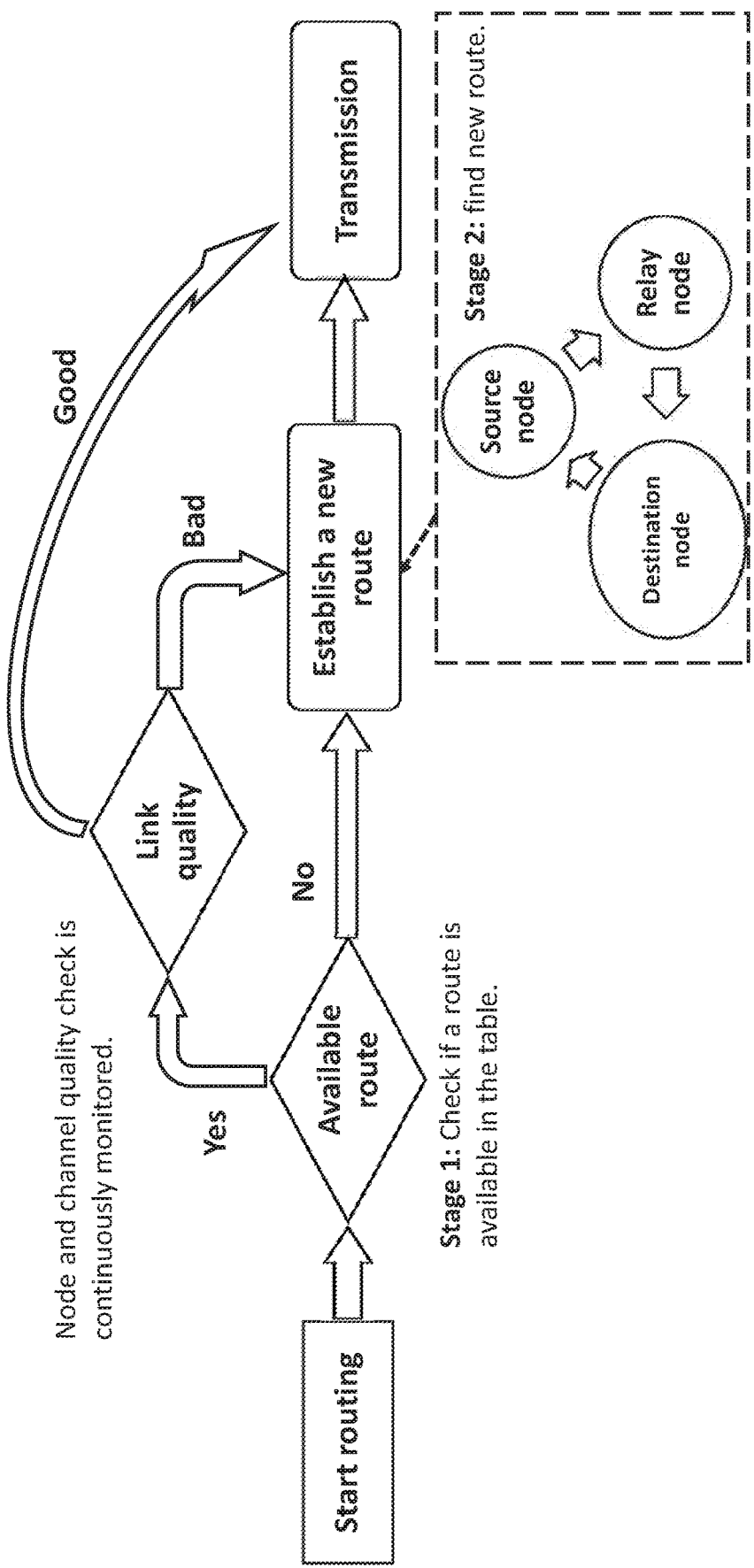
FIG. 7 illustrates an exemplary energy efficient routing process implemented through a network layer according to some embodiments of the present disclosure.

In the control plane of network layer, the energy efficient routing is performed by the network layer to find the route for each data packet with the aim of extending the lifetime of the entire system. FIG. 7 illustrates an exemplary energy efficient routing process implemented through the network layer according to some embodiments of the present disclosure.

As shown in FIG. 7, a routing algorithm may include two stages.

In Stage 1, the node checks if there is an available route in a routing table, e.g., a table recording the routes. Each node maintains its own routing table. When a node wants to determine the route to another node, it first checks if there is a route recorded in its routing table. If not, it moves to the second stage to find the route. If there is a route in the routing table, the user will test if the route is still good. If the route is no longer usable, the user removes the route from the routing table and find a new route.

If there is no available route, it enters Stage 2 to find a new route. If an available route exists, the source node checks the route quality by transmitting a testing packet along the route. Further, if the quality is acceptable, the source node starts transmitting data packets using the route. Otherwise, the route is deleted from the routing table, and the source node continues to Stage 2.

In some embodiments, the route quality is defined based on a cost function that evaluates a cost of a route, and parameters of the cost function include the battery level, queue length, mobility of each node, the energy consumption of each hop, and the number of hops of the entire route.

The cost of a route monotonically increases as the battery level and queue length of a node on the route increases. The connection between two neighboring nodes becomes weak due to the mobility, which also results in larger energy consumption (i.e., cost). The cost should also be an increasing function of the number of hops, since a longer route is less reliable in the battlefield, and it also causes longer delay.

In such a way, use of the disclosed method avoids the nodes with low battery and heavy traffic, and also avoids the links with weak connection or the links whose connection can potentially become unstable due to the mobility of the nodes. As a result, the lifetime of the network is extended and/or maximized, and the QoS is guaranteed.

Further, in Stage 2 of the routing algorithm, the source node tries to find a route to the destination that has the minimum cost. The source node broadcasts Route Request (RREQ) packets through the network. Each relay node keeps updating the minimum cost, and broadcasts updated RREQ packets to its neighbors when its minimum cost is updated. The destination node also keeps updating the minimum cost until it reaches a deadline, and then it chooses the route with the minimum cost and sends a Route Reply (RREP) packet back to the source node through the selected route to initialize the transmission.

Further, the connection maintenance is performed by the network layer to maintain connection(s) during the transmission. At the time when a route is initialized, each transmitter on the route records the initial state of the link to its corresponding receiver. Because each node can only observe the quality of links it participates, it can only records and monitor the quality of its link. A route has good quality means that every link on the route has good quality. If any link on the route has bad quality, then the route has bad quality. A link state, denoted as ST, may be formulated in terms of parameters such as average energy consumption, as well as the residual energy and queue length at the transmitter. The value ST increases as the average energy consumption and the queue length increases, or as the residual energy reduces. Further, a larger value of ST implies lower energy efficiency and shorter lifetime.

During the transmission, each link keeps updating its current state value (i.e., the value of ST), and compares it with its initial state value $ST_0$. If the current state value is greater than one or more certain thresholds, corresponding warning signals are sent to the source. In some embodiments, a three-level warning system is used, where a L1 warning signal is issued under the case of connection lost, a L2 warning signal is issued under the case of poor connection, and a L3 warning signal is issued under the case of slightly downgraded connection. For more complicated situations, more levels of warning can be arrangemented.

Figure 8:
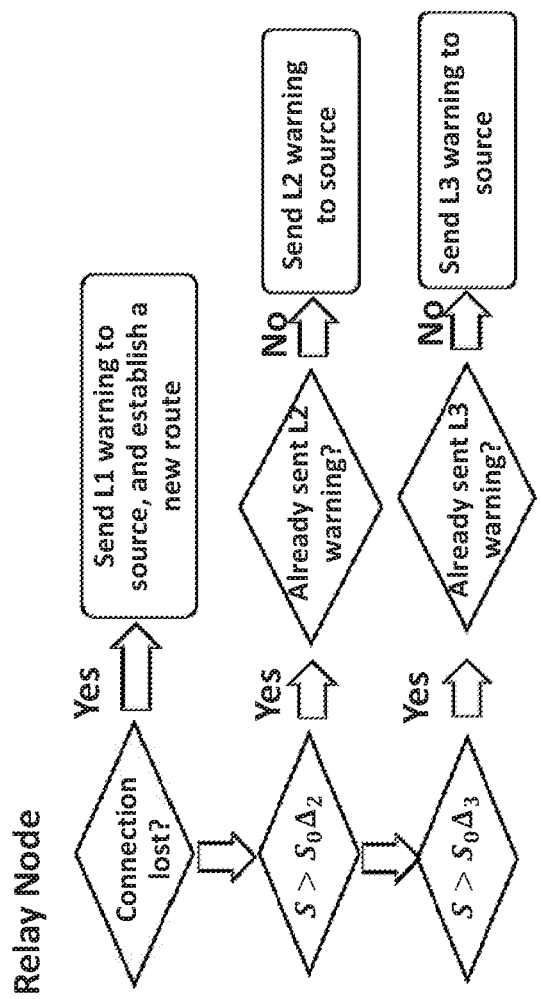
FIG. 8 illustrates an exemplary warning process at a relay node according to some embodiments of the present disclosure.
Figure 9:
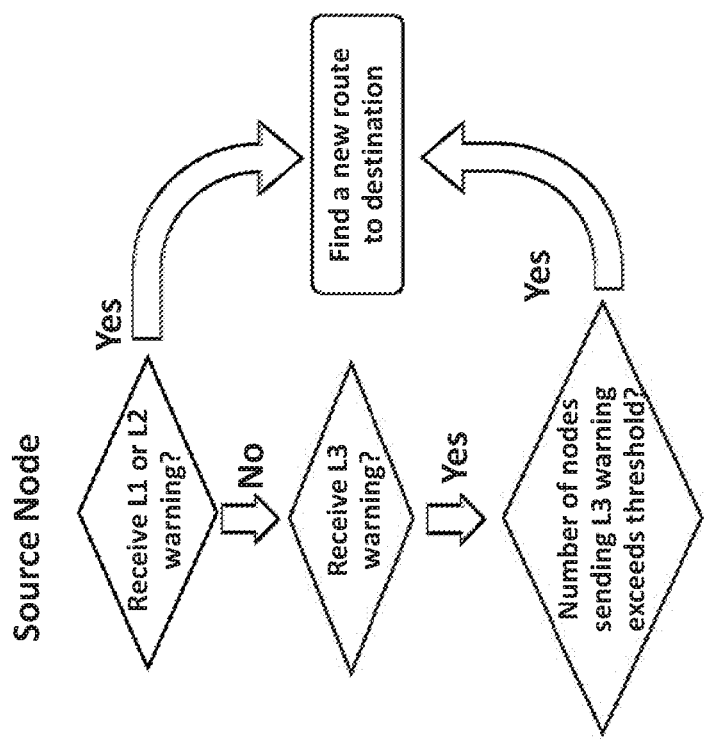
FIG. 9 illustrates an exemplary warning mechanism of a source node for connection maintenance, according to some embodiments of the present disclosure.

For example, the warning behaviors of a relay node and a source node are illustrated hereinbefore for illustrative purposes. FIG. 8 illustrates an exemplary warning process at a relay node according to some embodiments of the present disclosure. FIG. 9 illustrates an exemplary warning mechanism of a source node for connection maintenance, according to some embodiments of the present disclosure.

As shown in FIG. 8, whether connect lost occurs is determined. If a relay node is disconnected with a next node (connection lost), an L1 warning signal may be sent to the source node, and a new route to a destination may be select to redirect packets travelling along the current broken route. Further, if it is determined that there is no connection lost between the relay node and the next node, the current value of the state of the relay node (i.e., the value of ST) may be compared with two thresholds.

For example, given $ST_0$ representing the initial state of the relay node and $1<\Delta_2<\Delta_3$, ST may be compared with $ST_0\Delta_2$ and $ST_0\Delta_3$ to send the corresponding warning signals to the source node. In some embodiments, ST may be compared with $ST_0\Delta_2$, and when $ST>ST_0\Delta_2$, whether a L2 warning signal has been sent may be determined. If it is determined that no L2 warning signal is sent before, a L2 warning signal may be sent to the source node. Under situations where $ST \leq ST_0\Delta_2$, whether $ST>ST_0\Delta_3$ may be determined. When $ST_0\Delta_3<ST\leq ST_0\Delta_2$ becomes valid, whether a L3 warning signal has been sent is determined, and if it is determined that no L3 warning signal has been sent, a L3 warning signal may be sent to the source node.

$\Delta 2$ and $\Delta 3$ are the state thresholds for the L2 and L3 warnings respectively. They are numbers specified by the system. Here, the current state ST is compared with the thresholds $ST_0\Delta_2$ and $ST_0\Delta_3$ to see if the current link state can trigger L2 and L3 warnings.

Referring to FIG. 9, at the source node, when L1 and L2 warning signals are received, a new route may be selected. When receiving an L3 warning, the source node does not take immediate action to find a new route until it receives the L3 warning signals greater than a pre-determined number of times. Accordingly, the effect of connection maintenance is realized.

As such, an energy efficient arrangement for wireless communications and networking is provided. This arrangement includes a battlefield environment learning component, a physical layer control component that performs power optimization and waveform selection, a MAC layer control component that performs medium access control and resource block reconfiguration, and a network layer arrangement that performs energy efficiency aware routing and connection maintenance to extend the lifetime of the system. These components cooperate with each other to reduce the energy consumption of each individual wireless device, avoid interference among active links, balance the remaining battery energy over the entire network, and extend the lifetime of the network.

Other embodiments of the disclosure will be apparent to those skilled in the art from consideration of the specification and practice of the invention disclosed herein. It is intended that the specification and examples are considered as exemplary only, with a true scope and spirit of the invention being indicated by the claims.

What is claimed is:

1. A system for energy-efficiency wireless communication in a wireless device, comprising:
   a three-layer protocol stack, comprising:
      a physical layer;
      a medium access control (MAC) layer; and
      a network layer, wherein:
      the physical layer includes one or more circuits to conduct a power consumption minimization and a waveform selection to select, from a plurality of waveforms, a waveform with a minimal average energy consumption for a data packet transmission,
      the MAC layer is configured to perform a medium access control and a resource block reconfiguration in response to a connection loss,
      the network layer is configured to perform a route selection to select an energy efficient routing of data packet transmission between the wireless communication device and another communication device and to perform a connection maintenance to maintain a connection during the data packet transmission between the wireless communication device and the other communication device, and
      the physical layer, the MAC layer and the network layer cooperate with each other to at least reduce an energy consumption of the wireless communication device; and
   a battlefield environment learning circuitry, configured to learn variation of environments by tracking channel fading and interference strength via channel estimation and channel sensing techniques, respectively, and determine probability density functions of a channel gain and interference power using a kernel density estimation approach, and deliver the probability density functions to the three-layer protocol stack,
   wherein the physical layer is configured to receive information including the probability density functions of the channel gain and the interference power to conduct the average energy consumption minimization.

2. The system according to claim 1, wherein:
   a plurality of waveforms are arranged at the physical layer using a channel coding algorithm in combination with a modulation algorithm,
   for each waveform, an average power consumption is computed, and a transmission power that minimizes the average power consumption is determined based on a plurality of QoS constraints, and
   based on the transmission power that minimizes the average energy consumption, a waveform corresponding to a minimized average energy consumption is selected among the plurality of waveforms as an optimal waveform for transmission.

3. The system according to claim 2, wherein:
   the channel coding algorithm includes a low density parity check (LDPC) coding algorithm,
   the modulation algorithm includes a quadrature phase shift keying (QPSK) algorithm and an eight phase shift keying (8PSK) algorithm, and
   different LDPC coding algorithms have different coding rates.

4. The system according to claim 1, wherein the MAC layer is configured to perform the medium access control by:
   for each link formed by a receiver and a corresponding transmitter, selecting an available resource block,
   performing, by each link, channel sensing to confirm a selected resource block is usable,
   when the selected resource block is usable, selecting a link with a highest utility value, and confirming the link with the highest utility value to start transmission.

5. The system according to claim 1, wherein the MAC layer is configured to perform a resource block reconfiguration process by:
   detecting, by a receiver, an interference,
   broadcasting, by the receiver, a reconfiguration signal via a control channel to pause transmission, and
   scheduling a random period to resume the transmission.

6. The system according to claim 1, wherein the network layer is configured to perform the energy efficient routing by:
   determining whether a route is recorded in a routing table,
   when the route is recorded in a pre-configured table, checking a route quality by transmitting a testing packet along the route,
   in response to the route quality being acceptable, a source node of the route starts to transmit one or more data packets, and
   in response to the route quality being unacceptable, deleting the route from the routing table,
   wherein the route quality is evaluated based on a cost of the route calculated using a cost function.

7. The system according to claim 6, wherein the network layer is further configured to:
   when the route is not recorded in the pre-configured table, send, by a source node, a route request packet to a destination node of the route via a plurality of relay nodes,
   wherein the plurality of relay nodes are configured to update a cost of the route, thereby selecting a route with a minimum cost as a desired route for transmission.

8. A wireless communication network, comprising:
   a plurality of nodes, each node comprising a three-layer protocol stack and a battlefield environment learning circuitry,
   wherein the three-layer protocol stack comprising:
      a physical layer; a medium access control (MAC) layer; a network layer, wherein:
      the physical layer includes one or more circuits to conduct a power consumption minimization and a waveform selection to select, from a plurality of waveforms, a waveform with a minimal average energy consumption for a data packet transmission,
      the MAC layer is configured to perform a medium access control and a resource block reconfiguration in response to a connection loss,
      the network layer is configured to perform a route selection to select an energy efficient routing of data packet transmission between a wireless communication device and another communication device and to perform a connection maintenance to maintain a connection during the data packet transmission between the wireless communication device and the other communication device, and
      the physical layer, the MAC layer and the network layer cooperate with each other to at least reduce an energy consumption of the wireless communication device; and
   wherein the battlefield environment learning circuitry is configured to learn variation of environments by tracking channel fading and interference strength via channel estimation and channel sensing techniques, respectively, and determine probability density functions of a channel gain and interference power using a kernel density estimation approach, and deliver the probability density functions to the three-layer protocol stack,
   wherein the physical layer is configured to receive information including the probability density functions of the channel gain and the interference power to conduct the average energy consumption minimization.

9. The network according to claim 8, wherein:
each node includes a transceiver for transmitting and receiving signals, a processor, a memory, and an energy source.

10. The network according to claim 8, wherein:
each node includes a wireless communication device.

* * * * *